United States Patent [19]

Wu et al.

[11] Patent Number: 5,726,254
[45] Date of Patent: Mar. 10, 1998

[54] AMINORESIN BASED COATINGS CONTAINING 1,3,5-TRIAZINE TRIS-CARBAMATE CO-CROSSLINKERS

[75] Inventors: Kuang-Jong Wu, Shelton, Conn.; Doris C. O'Toole, Carmel, N.Y.

[73] Assignee: Cytec Technology Corp., Wilmington, Del.

[21] Appl. No.: 779,535

[22] Filed: Jan. 8, 1997

Related U.S. Application Data

[60] Continuation of Ser. No. 437,192, May 8, 1995, Pat. No. 5,593,735, which is a division of Ser. No. 998,313, Dec. 29, 1992, Pat. No. 5,574,103.

[51] Int. Cl.$^6$ .................................................. C08F 8/32
[52] U.S. Cl. ........................ 525/375; 525/329.5; 525/437
[58] Field of Search .............................. 525/375, 329.5, 525/437

[56] References Cited

U.S. PATENT DOCUMENTS

| | | | |
|---|---|---|---|
| 3,291,763 | 12/1966 | Becalick et al. | 260/13 |
| 4,634,738 | 1/1987 | Santer | 525/162 |
| 4,708,984 | 11/1987 | Forgione et al. | 525/127 |
| 4,879,410 | 11/1989 | Singh et al. | 560/344 |
| 4,939,213 | 7/1990 | Jacobs, III et al. | 525/329.9 |
| 5,084,541 | 1/1992 | Jacobs, III et al. | 528/45 |
| 5,166,289 | 11/1992 | Yezrielev et al. | 525/443 |

FOREIGN PATENT DOCUMENTS

193517A2   9/1986   European Pat. Off. .

OTHER PUBLICATIONS

European Search Report dated Apr. 29, 1994, For Application 93120846.6.
P. Bruins, Polyurethane Technology, p. 11, John Wiley & Sons (1969).
Z. Wicks, Jr., "Blocked Isocyanates," Progress in Organic Coatings, 3, pp. 73, 79 (1975).

*Primary Examiner*—Shrive Beck
*Assistant Examiner*—Erma Cameron
*Attorney, Agent, or Firm*—Bart E. Lerman; Claire M. Schultz; Michael J. Kelly

[57] ABSTRACT

An acid cured coating composition containing a hydroxyfunctional acrylic or polyester resin and a 1,3,5-triazine-2,4,6-tris-carbamate. Also provided is an acid cured coating composition containing a hydroxyfunctional acrylic or polyester resin, a crosslinking agent such as a melamine-formaldehyde or a related aminoresin, and a co-crosslinking agent derived from a triazine tris-carbamate such as 2,4,6-tris-(butoxycarbonylamino)-1,3,5-triazine. Also provided is an improved method of coating using the above coating compositions. The coating compositions described in this invention have lower cure temperatures, lower formaldehyde emissions during cure, and produce films and objects which have superior environmental etch resistance than the conventional melamine-formaldehyde coatings which do not have a triazine tris-carbamate co-crosslinker.

16 Claims, No Drawings

AMINORESIN BASED COATINGS CONTAINING 1,3,5-TRIAZINE TRIS-CARBAMATE CO-CROSSLINKERS

This application is a continuation of U.S. application Ser. No. 08/437,192, filed May 8, 1995, now U.S. Pat. No. 5,593,735 which is a divisional of U.S. application Ser. No. 07/998,313, filed Dec. 29, 1992, now U.S. Pat. No. 5,574,103, both of which are herein incorporated by reference for all purposes as if fully set forth.

BACKGROUND OF THE INVENTION

1. Field of the Invention

This invention relates to curable compositions containing polyfunctional hydroxy group containing materials and a 1,3,5-triazine-2,4,6-tris-carbamates. This invention also relates to aminoresin containing curable compositions which additionally contain a 1,3,5-triazine-2,4,6-tris-carbamate derivative as a co-crosslinking agent. Both compositions contain an acid cure catalyst.

2. Description of the Related Art

Aminoresin based coatings are well known in the art and have been used for nearly half a century in diverse applications including general industrial coatings, automotive coatings, coil coatings, powder coatings baking enamels, and wood finishes. Among the major drawbacks of aminoresin based coatings are formaldehyde emissions during cure and poor environmental etch resistance of the cured coatings.

Alkyl and aryl 1,3,5-triazine-2,4,6-tris-carbamates and coatings prepared therefrom have been described in a copending application Ser. No. 07/793,077 filed on Nov. 15, 1991; and in U.S. Pat. Nos. 5,084,541 and 4,939,213. Coating prepared by using 1,3,5-triazine-2,4,6-tris-carbamate crosslinkers, although generally satisfactory, are tin-catalyzed systems of high cost, requiring relatively high bake temperatures to cure. They also yellow to some extent, in part due to the high bake temperatures required for cure.

It is the object of this invention to provide coatings which have the advantages of melamine based systems such as low cost and low cure temperatures, and the advantages of 1,3,5-trizine-2,4,6-tris-carbamate based systems such as good environmental etch resistance and absence of formaldehyde emissions during cure, without the drawbacks of either system. Accordingly, described herein is a curable composition which comprises, as an additive to the commonly used aminoresin coating compositions, a 1,3,5-triazine-2,4,6-tris-carbamate co-crosslinking agent. The novel curable compositions described herein have low formaldehyde emissions when cured and have superior environmental etch resistance than the aminoresin based systems commonly used in the coatings industry.

SUMMARY OF THE INVENTION

This invention is a curable composition, comprising:
(1) a polyfunctional hydroxy group containing material;
(2) a 1,3,5-triazine-2,4,6-tris-carbamate; and
(3) an acid cure catalyst.

This invention is also a curable composition, comprising:
(a) a polyfunctional hydroxy group containing material;
(b) an aminoresin crosslinking agent;
(c) a triazine tris-carbamate co-crosslinking agent; and
(d) an acid cure catalyst.

This invention is also an improved method of coating comprising contacting a substrate with the curable compositions of the invention and thereafter heat curing.

The composition and the method of this invention have low cure temperatures and low formaldehyde emissions during cure. They also produce films and objects which have superior environmental etch resistance than conventional aminoresin derived coatings.

DETAILED DESCRIPTION

We have discovered, surprisingly, that when a carbamate co-crosslinking agent is added to conventional aminoresin based coating compositions, three of the major deficiencies of the aminoresin and tris-carbamate based coatings are overcome:

(1) the cure temperatures of the tris-carbamate derived compositions are lowered by using an acid catalyst instead of a tin catalyst or no catalyst at all;

(2) the high formaldehyde emissions normally encountered in aminoresin derived curable compositions during cure are reduced to lower levels; and (3) coatings produced from curable compositions containing a carbamate co-crosslinking agent have superior environmental etch resistance when compared with conventional aminoresin coatings.

This invention is a curable composition comprising:
(1) a polyfunctional hydroxy group containing compound;
(2) a 1,3,5-triazine-2,4,6-tris-carbamate; and
(3) an acid cure catalyst.

The above composition is characterized by the use of an acid cure catalyst instead of a tin catalyst described in U.S. Pat. Nos. 5,084,541 and 4,939,213. Compositions described in the cited patents are not suitable for use in coatings when the curable composition additionally contains an aminoresin crosslinking agent. In contrast, the curable compositions described herein may additionally contain an aminoresin and produce, upon cure, superior coatings.

This invention, therefore, is also a curable composition, comprising:
(a) a polyfunctional hydroxy group containing material;
(b) an aminoresin crosslinking agent;
(c) a carbamate co-crosslinking agent; and
(d) a cure catalyst.

The curable compositions of this invention have utility in coatings, such as general industrial coatings, automotive coatings, coil coatings, powder coatings, baked enamels, and wood finishes. They are also usable as molding and adhesive compositions.

The aminoresin containing curable compositions of the invention comprise:
(a) a polyfunctional hydroxy group containing material;
(b) an aminoresin crosslinking agent;
(c) a carbamate co-crosslinking agent selected from the group consisting of:
   (i) a 1,3,5-triazine-2,4,6-tris-carbamate of the formula $C_3N_3(NHCOOR)_3$, wherein R in each NHCOOR group is independently selected from the group consisting of an alkyl of 1 to 20 carbon atoms, an aryl of 6 to 20 carbon atoms, an aralkyl of 7 to 20 carbon atoms, and a mixture thereof;
   (ii) an oligomer of (i); and
   (iii) a mixture of (i) and (ii); and
(d) an acid cure catalyst.

These compositions are described in greater detail below.

Polyfunctional Materials

The polyfunctional hydroxy group containing materials usable in the curable compositions of the invention are those conventionally used in aminoresin coatings and are capable of reacting with both aminoresin crosslinking agents and with carbamate co-crosslinking agents.

Suitable polyfunctional hydroxy group containing materials include polyols, hydroxyfunctional acrylic resins containing pendant or terminal hydroxy functionalities, hydroxyfunctional polyester resins containing pendant or terminal hydroxy functionalities, hydroxyfunctional polyurethane prepolymers, products derived from condensation of epoxy, resins with an amine, and a mixture thereof.

Acrylic and polyester resins are preferred.

An example of a suitable polyfunctional acrylic resin available commercially from S. C. Johnson & Sons, inc., is JONCRYL® 500 acrylic resin, comprising a copolymer of styrene (50%), hydroxypropyl methacrylate (20%) and butyl acrylate (30%) having the following properties:

| Solids Content (%) | 80 |
| Hydroxyl Number (based on solids) | 140 |
| Equivalent Weight (based on solids) | 400 |
| Viscosity (Centipoise) | 4,000 |
| Molecular Weight, Number Average | 1,300 |
| Molecular Weight, Weight Average | 2,210 |
| Polydispersity | 1.7 |

A similar resin is also available from Rohm & Haas under the trademark AT-400.

Other examples of suitable polyfunctional hydroxy group containing materials include commercially available polyester resins such as CYPLEX® 1531, a polyester of phthalic acid, adipic acid, ethanediol, and trimethylolpropane, a product of Cytec Industries, West Paterson, N.J.; CARGIL POLYESTER 5776 available from Cargill Corporation; TONE® polylactone resins available from Union Carbide Corporation; K-FLEX® XM-2302 and XM-2306, a product of King industries, Norwalk, Conn.; and CHEMPOL® 11-1369, a product of Cook Composites and Polymers, Port Washington, Wis.

Aminoresin Crosslinking Agents

The aminoresin crosslinking agents usable in the curable compositions of the invention are partially or fully methylolated, substantially fully etherified amino compounds such as melamine, glycoluril, guanamine, and urea. They may be monomeric or oligomeric, the oligomeric forms arising from the self condensation of the monomeric forms under acidic conditions, and particularly under acidic conditions at super ambient temperatures. The aminoresin crosslinking agents of the invention are further characterized by having at least 2, and preferably more than 2 crosslinkingly reactive groups such as alkyoxymethyl groups per crosslinker molecule.

The aminoresin crosslinking agents usable in the curable compositions of the invention are examplified further hereinbelow:

Melamine-based aminoresin crosslinking agents are well known in the art and have been used extensively as effective crosslinkers in coatings. The alkoxymethylmelamine functionality can be a maximum of six in a crosslinkingly effective range of 2 to 6 alkoxymethyl groups per each melamine molecule. In addition to monomers, alkoxymethyl melamines can contain dimers, trimers, tetramers, and higher oligomers, each given combination of comonomers and oligomers being preferred for a given application. For example, the lower viscosity monomer-rich compositions are preferred for solvent-based high solids coatings.

An example of the substantially fully etherified, substantially fully methylolated, substantially monomeric melamines usable in this invention is CYMEL® 303 melamine crosslinking agent, a product of Cytec Industries, West Paterson, N.J., having the following physical and chemical properties:

| Non-Volatiles (% by weight)* | 98 |
| Color, Maximum (Gardner 1963) | 1 |
| Viscosity (Gardner-Holt, at 25° C.) | X-Z |
| Free Formaldehyde, maximum (weight %) | 0.5 |
| Degree of Polymerization | 1.75 |

*Foil Method (45° C./45 min).

An example of a partially methylolated, substantially fully etherified partially oligomeric melamine-formaldehyde resin is CYMEL® 323 melamine crosslinking agent, a product of Cytec Industries, West Paterson, N.J., having the following properties:

| Principal Reactive Group | NHCH$_2$OCH$_3$ |
| Solvent | Isobutanol |
| Degree of Polymerization* | 2.2 |
| Non-Volatiles (1% by weight**) | 80 ± 2 |
| Viscosity (Gardner-Holt, at 25° C.) | Y-Z$_2$ |
| Viscosity (Poise, approximate) | 30-71 |

*Degree of Polymerization: Average number of triazine units per molecule.
**Foil method (45° C./45 min).

An example of the substantially fully etherified, substantially fully methylolated, substantially monomeric mixed alkyl melamines is CYMEL® 1168 melamine crosslinking agent, a product of Cytec Industries, West Paterson, N.J. The alkyl group in CYMEL® 1168 consists essentially of a mixture of methyl and isobutyl groups. It has the following properties:

| Non-Volatiles (% by weight)* | 98 |
| Color, Maximum (Gardner 1963) | 1 |
| Viscosity (Gardner-Holt, at 25° C.) | X-Z |
| Free Formaldehyde, maximum (weight %) | 0.5 |
| Equivalent Weight | 150-230 |

*Foil Method (45° C./45 min).

An example of a substantially methylolated, partially etherified, substantially oligomeric melamine is CYMEL® 370 crosslinking agent, a product of Cytec Industries, West Paterson, N.J. It has the following properties:

| Non-Volatiles (% by weight)* | 88 ± 2 |
| Solvent | Isobutanol |
| Color, Maximum (Gardner 1963) | 1 |
| Viscosity (Gardner-Holt, at 25° C.) | Z$_2$-Z$_4$ |
| Equivalent Weight | 225-325 |

*Foil Method (45° C./45 min).

The preferred glycoluril crosslinkers of this invention are N-alkoxymethyl substituted glycolurils wherein at least two of the alkyl groups in the alkoxymethyls are selected from a group consisting of methoxymethyl, ethoxymethyl, propoxymethyl, butoxymethyl, pentoxymethyl, hexoxymethyl, heptoxymethyl, octoxymethyl, nonoxymethyl, decoxymethyl and mixtures thereof, and the remaining alkyl groups are selected from hydrogen, alkyl, hydroxymethyl, and glycoluril group-containing oligomeric moieties.

While it is preferable to have 4 alkoxymethyl groups per each glycoluril crosslinking agent, under ordinary circumstances it may not be necessary to obtain the pure tetrasubstituted monomeric crosslinker N,N',N",N'"-tetraalkoxymethylglycolurils, so that resinous materials are normally usable.

The monomeric tetraalkoxyglycolurils themselves are not considered to be resinous materials since they are, as individual entities, non-polymeric compounds. They are considered, however, to be potential resin-forming compounds when subjected to heat, and particularly when subjected to heat under acidic conditions. As a result of the described resin-forming ability, the substantially monomeric glycoluril crosslinkers of this invention may contain some higher oligomeric components such as dimers, trimers, and tetramers. The presence of modest amounts of these oligomeric forms is permissible and indeed beneficial in cases where a high melting solid crosslinker is desirable as it is the case in powder coatings.

An example of glycoluril crosslinker of this invention is POWDERLINK® 1174 Powder Crosslinking Agent, a product of Cytec Industries, West Paterson, N.J., and has the following properties:

| Non-Volatiles, minimum (% by weight) | 98 |
|---|---|
| Appearance | White to pale yellow granulated flakes |
| Melting Point (°C.) | 90–110° C. |
| Average Molecular Weight | 350 |
| Equivalent Weight | 90–125 |

Another example of a glycoluril crosslinker of this invention is CYMEL® 1170 fully butylated glycoluril crosslinker, a product of Cytec Industries, West Paterson, N.J., having the following properties:

| Non-Volatiles, minimum (% by weight) | 95 |
|---|---|
| Appearance | Clear liquid |
| Color, Maximum (Gardner, 1963) | 3 |
| Viscosity (Gardner-Holt, 25° C.) | X–Z$_2$ |
| Molecular Weight, Average | 550 |
| Equivalent Weight | 150–230 |
| Methylol Content | Very low |

As in melamines, the partially or fully methylolated or etherified alkyl and aryl guanamine aminoresins, both in their monomeric and oligomeric forms, are usable as crosslinking agents in this invention, with the selection depending on the particular application or the properties desired in the product.

Benzoguanamine, cyctohexylcarboguanamine and acetoguanamine aminoresins are especially preferred as crosslinkers in this invention.

An example of a benzoguanamine-based crosslinking agent is CYMEL® 1123 resin, a product of Cytec industries, West Paterson, N.J., wherein the alkyl in the alkoxymethyls is a mixture of methyl and ethyl groups.

An example of a urea crosslinker usable in this invention is BEETLE® 80 butylated urea formaldehyde resin, a product of Cytec industries, West Paterson, N.J., having the following properties:

| Non-Volatiles (% by weight)* | 96 ± 2 |
|---|---|
| Solvent Tolerance (ASTM D1198-55) | >500 |
| Color, Maximum (Gardner 1963) | 1 |
| Viscosity (Gardner-Holt, at 25° C.) | X–Z$_2$ |

*Foil Method (45° C./45 min).

It is evident from the discussions above, that a person skilled in the art, in selecting the most suitable crosslinker for a particular application, may choose a mixture thereof which imparts a balance of properties desired for that particular application.

Carbamate Co-Crosslinking Agents

The carbamate co-crosslinking agents usable in the curable compositions of the invention are 1,3,5-triazine-2,4,6-tris-carbamates having the following formula:

$$C_3N_3(NHCOOR)_3$$

wherein R in each NHCOOR group is independently selected from the group consisting of an alkyl of 1 to 20 carbon atoms, an aryl of 6 to 20 carbon atoms, an aralkyl of 7 to 20 carbon atoms, and a mixture thereof.

The preferred carbamate co-crosslinking agents are carbamates wherein the R group is an alkyl group of 1 to 8 carbon atoms. Particularly preferred are 2,4,6-tris-(methoxycarbonylamino)-1,3,5-triazine represented by the formula:

$$C_3N_3(NHCOOCH_3)_3$$

and 2,4,6-tris-(butoxycarbonylamino)-1,3,5-triazine represented by the formula:

$$C_3N_3(NHCOOCH_2CH_2CH_2CH_3)_3$$

and a mixture thereof.

The carbamate co-crosslinking agents may be prepared by procedures described in a copending application Ser. No. 07/793,077 filed on Nov. 5, 1991, and in U.S. Pat. Nos. 5,084,541 and 4,939,213, the contents of which are incorporated herein by reference.

Cure Catalysts

As set forth herein, the curable composition optionally also includes a cure catalyst. As is recognized in U.S. Pat. Nos. 5,084,541 and 4,939,213, a tin catalyst is typically required when a curable composition contains a 1,3,5-triazine-tris-carbamate derivative as the sole crosslinking agent. Uncatalyzed or acid catalyzed curable compositions containing 1,3,5-triazine-tris-carbamate derivatives remain hitherto unreported.

It is the discovery of this invention to provide acid catalyzed curable compositions capable of simultaneous cure by the aminoresin crosslinkers and the 1,3,5-triazine-tris-carbamate co-crosslinkers present therein.

The cure catalysts usable in the curable compositions of the invention include sulfonic acids, aryl and alkyl acid phosphates and pyrophosphates, carboxylic acids, sulfonimides, mineral acids, and mixtures thereof. Of the above acids, sulfonic acids are preferred. Examples of sulfonic acids include benzenesulfonic acid, paratoluenesulfonic acid, dodecylbenzenesulfonic acid, naphthalenesulfonic acid, dinonylnaphthalenedisulfonic acid, and a mixture thereof. Examples of the dialkyl acid pyrophosphates include phenyl, methyl, ethyl, diphenyl, dimethyl and diethyl acid phosphates and pyrophosphates. Examples of carboxylic acids include benzoic acid, propionic acid, butyric acid, formic acid, oxalic acid, trifluoroacetic acid, and the like. Examples of the sulfonimides include dibenzenesulfonimide, di-para-toluenesulfonimide, methyl-para-moluenesulfonimide, dimethylsulfonimide, and the like. Examples of the mineral acids include nitric acid, sulfuric acid, phosphoric acid, polyphosphoric acid, and the like.

Ratio and Proportions of the Ingredients

In the practice of the invention, a crosslinkingly effective amount of an aminoresin crosslinking agent and a 1,3,5-triazine 2,4,6-tris-carbamate co-crosslinking agent is used. It is desirable to crosslink at least one half of the hydroxy functionalities present in the polyfunctional hydroxy group containing material to obtain coatings of good physical and resistance properties. It is preferred, however, that the mole ratio of the hydroxy groups to the sum of the crosslinkingly effective functionalities present in the aminoresin crosslinking agent and the 1,3,5-triazine 2,4,6-triazine tris-carbamate co-crosslinking agent is in the range of from 0.8:1 to 1.2.:1.

The weight ratio of the aminoresin crosslinking agent to the carbamate co-crosslinking agent usable in the curable composition of the invention are typically in the range of from 99:1 to 0.2:1. The weight ratio of the polyfunctional hydroxy group containing material no the sum of the aminoresin crosslinking agent and the carbamate co-crosslinking agent is in the range of from 99:1 to 0.5:1. The weight percent of the acid cure catalyst to the sum of the polyfunctional hydroxy group containing material, the aminoresin crosslinking agent, and the carbamate co-crosslinking agent is in the range of from 0.01 weight percent to 5 weight percent.

Optional Ingredients

The optional ingredients present in the curable composition of the invention vary depending on the intended use of the cured article or film.

Suitable optional ingredients include fillers, ultraviolet light stabilizers, pigments, flow control agent, plasticizers, mold release agents, and corrosion inhibitors.

The composition of the invention may contain as an optional ingredient a liquid medium. Such a medium may be used to aid the uniform application and transport of the curable composition. Any or all of the ingredients of the composition may be contacted with the liquid medium. Moreover, the liquid medium may permit formation of a dispersion, emulsion, invert emulsion, or solution of the curable composition ingredients. Particularly preferred is a liquid medium which is a solvent for the curable composition ingredients (a), (b), (c), and (d). Suitable solvents are selected from alcohols, ketones, ethers, esters, water, aliphatic hydrocarbons, aromatic hydrocarbons, halogenated hydrocarbons and mixtures thereof.

Improved Method of Coating

Another aspect of this invention is an improved method of coating or substrate said method being of the type having the steps of contacting a substrate with a curable composition containing a polyfunctional hydroxy group containing material and a 1,3,5-triazine-2,4,6-tris-carbamate, and thereafter heat curing said curable composition, wherein the improvement comprises:

(A) contacting said substrate with a curable composition, comprising:
  (1) a polyfunctional hydroxy group containing material;
  (2) a 1,3,5-triazine-2,4,6-tris-carbamate; and
  (3) an acid cure catalyst; and thereafter
(B) heat curing said curable composition to produce a crosslinked film or object.

Another method of this invention is an improved method of coating a substrate, said method being of the type having the steps of contacting said substrate with a curable composition containing a polyfunctional hydroxy group containing material, an aminoresin crosslinking agent, and an acid cure catalyst, and thereafter heat curing said curable composition, wherein the improvement comprises:

(C) contacting said substrate with a curable composition, comprising:
  (1) a polyfunctional hydroxy group containing material;
  (2) an aminoresin crosslinking agent;
  (3) a carbamate co-crosslinking agent selected from the group consisting of:
    (i) a 1,3,5-triazine tris-carbamate of the formula $C_3N_3(NHCOOR)_3$, wherein R in each NHCOOR group is independently selected from the group consisting of an alkyl of 1 to 20 carbon atoms, an aryl of 6 to 20 carbon atoms, an aralkyl of 7 to 20 carbon atoms, and a mixture thereof;
    (ii an oligomer of (i); and
    (iii a mixture of (i) and (ii); and
(D) heat curing said curable composition to produce a crosslinked film or object.

In the practice of the methods of the invention, the curable compositions of the invention containing the 1,3,5-triazine-2,4,6-tris-carbamate co-crosslinkers are typically formulated as a liquid paint and applied onto a substrate by a method such as padding, brushing, rollercoating, curtain coating, flowcoating, electrostatic spraying, electrocoating or dipping. The coated substrate thereafter is heat cured at a temperature typically in the range of from 90° C. to about 140° C. to effect crosslinking and producing cured films or objects.

For powder coating applications, solid ingredients and higher temperatures in the range of 175° C. to 190° C. are typically used. "Powder coating" is an art recognized coating process and is defined herein as a method of electrostatic powder spraying wherein a finely divided solid coating material is electrostatically attracted to a surface of an article. Alternatively, the powder coating composition may be contacted with the substrate by immersing the substrate in fluidized bed of powder. The article covered with the powder is heated to at least the fusion temperature of the coating composition forcing it to flow out and form a coating which is cured by further application of heat.

For coil coating applications, temperatures typically in the range of 180° C. to 360° C. are used to cure.

Crosslinked Articles and Coatings Formed by the Compositions of this Invention The curable compositions of this invention containing the carbamate co-crosslinkers of the invention can be heat cured (typically 90° C. to 140° C.) to produce crosslinked moulded articles, adhesives and coatings. Because of the polyfunctional nature of the reactants, the resulting product in this case is a crosslinked article in the form of a film such as adhesives or coatings or in the form of an article such as molded products and objects.

The heat-cured compositions of this invention may be employed as coatings for wire, appliances, automotive parts, furniture, pipes, machinery, and the like. Suitable surfaces include glass, plastics, wood and metals such as steel, and aluminum.

The heat-cured compositions may also be used to form solid articles such as cases, enclosures, and structural members.

The following Examples illustrate various embodiments of the invention.

EXAMPLE 1

Preparation of Acrylic Copolymer A

The polyfunctional hydroxy group containing material ACRYLIC COPOLYMER A was prepared as follows:

COPOLYMER A was prepared by admixing COPOLYMER B (70.2 g), COPOLYMER C (63.5 g), and normal butyl acetate (13.3 g).

Preparation of Copolymer B

A first stream of a solution containing tertiary butyl peroctoate (28.94 g), tertiary amyl perbenzoate (5.11 g), and meta-xylene (11.35 g) and a second stream of a solution containing methyl methacrylate (231.9 g), styrene (62.6 g), normal butyl acrylate (27.5 g), and hydroxyethyl acrylate (178.8 g) were simultaneously introduced, over a period of 5 hours, into a flask containing meta-xylene (305 g) at 138° C. to 140° C. After heating at 140° C. for an additional 3 hours, a portion off the volatiles (about 85 g) was removed to give COPOLYMER B having the following properties:

| | |
|---|---|
| % Solids | 71.2 |
| % Hydroxide | 3.58 |
| Molecular Weight: | |
| Number Average: | 4,000 |
| Weight Average: | 7,900 |
| Polydispersity | 1.97 |
| Glass Transition (Tg) | |
| By DMA (°C.) | 57 ± 2 |
| By DSC (°C.) | 38 ± 1 |

Preparation of Copolymer C

The procedure for preparation of COPOLYMER B was repeated with the following changes:

| | |
|---|---|
| FIRST STREAM: | |
| TRIGONOX 29-B&% Initiator (g) | 38.56 |
| Meta Xylene (g) | 12.86 |
| SECOND STREAM: | |
| Methyl Methacrylate (g) | 232.3 |
| Normal Butyl Acrylate (g) | 101.4 |
| Hydroxyethyl Methacrylate (g) | 165.8 |
| Meta Xylene in the Flask (g) | 202.7 |

The product formed was COPOLYMER C having the following properties:

| | |
|---|---|
| % Solids | 78.7 |
| % Hydroxide | 3.19 |
| Molecular Weight: | |
| Number Average: | 3,900 |
| Weight Average: | 8,600 |
| Polydispersity | 2.20 |
| Glass Transition (Tg) | |
| By DMA (°C.) | 40 ± 1 |
| By DSC (°C.) | 22 ± 1 |

EXAMPLE 2

Three coatings derived from a composition containing the hydroxyfunctional acrylic resin COPOLYMER A of EXAMPLE 1 and 2,4,6-tris-(butoxycarbonylamino)-1,3,5-triazine were heat-cured with:

| | |
|---|---|
| (1) para-toluenesulfonic acid | (COATING A) |
| (2) dimethyl tin dilaurate | (COATING B) |
| (3) no catalyst | (COATING C) |

The coatings were formulated, applied onto base-coated panels and cured as follows:

| | COATING | | |
|---|---|---|---|
| | A | B | C |
| ACRYLIC COPOLYMER A OF EXAMPLE 1 (g) | 73.3 | 73.3 | 73.3 |
| 2,4,6-tris-(Butoxycarbonylamino)-1,3,5-triazine (g) | 26.7 | 26.7 | 26.7 |
| Catalyst: | | | |
| (1) para-Toluenesulfonic acid (g) | 0.5 | — | — |
| (2) Dimethyl Tin Dilaurate (g) | — | 0.5 | — |
| (3) No Catalyst | — | — | 0.0 |
| Substrate, White Base-Coated Panels | ED-11 CRS* | | |
| Cure Schedule (Table 1) | 125° C./30 min. | | |
| (Table 2) | 125° C./30 min. | | |

*ED-11 primed cold rolled steel (CRS) is a product of Advanced Coating Technologies, Inc., Hillsdale, MI.

The cured coatings A, B, and C were thereafter analyzed for performance. The results are summarized in Table 1 for 125° C./30 min. cure schedule and in Table 2 for 135° C./30 min. cure schedule coatings.

TABLE 1

SOLVENT RESISTANCE* OF 2,4,6-TRIS-(BUTOXYCARBONYL-AMINO)-1,3,5-TRIAZINE CONTAINING COMPOSITIONS IN ACID CATALYZED, TIN CATALYZED, AND UNCATALYZED COATINGS CURED AT 125° C./30 MINUTES SCHEDULES

| | COATING A | COATING B | COATING C |
|---|---|---|---|
| Thickness (mils) | 1.8 | 1.8 | 1.9 |
| (mm) | 0.046 | 0.046 | 0.048 |
| Hardness, $KHN_{25}$ | 12.4 | 12.5 | 12.4 |
| Pencil | H-2H | H-2H | H-2H |
| Methyl Ethyl Ketone | | | |
| Rubs, to Mar | 200+ | 200 | 100 |
| to Remove | 200+ | 200+ | 200+ |
| Yellow Index, | | | |
| Original | −3.9 | −3.9 | −4.0 |
| After 1st 30 min | −3.9 | −3.9 | −4.0 |
| Overbake | | | |
| After 2nd 30 min. | −3.8 | −3.8 | −3.9 |
| Overbake | | | |

*Solvent Resistance is measured by Methyl Ethyl Ketone (MEK) Double Rubs "to mar" or "to remove" the coating. Highly crosslinked coatings require 200+ (i.e. more than 200) MEK Rubs to mar.

TABLE 2

SOLVENT RESISTANCE* OF 2,4,6-TRIS-(BUTOXYCARBONYL-AMINO)-1,3,5-TRIAZINE CONTAINING COMPOSITIONS IN ACID CATALYZED, TIN CATALYZED, AND UNCATALYZED COATINGS CURED AT 135° C./30 MINUTES SCHEDULES

| | COATING A | COATING B | COATING C |
|---|---|---|---|
| Thickness (mils) | 1.8 | 1.9 | 1.8 |
| (mm) | 0.046 | 0.048 | 0.046 |
| Hardness, $KHN_{25}$ | 14.4 | 13.2 | 13.4 |

TABLE 2-continued

SOLVENT RESISTANCE* OF 2,4,6-TRIS-(BUTOXYCARBONYL-AMINO)-1,3,5-TRIAZINE CONTAINING COMPOSITIONS IN ACID CATALYZED, TIN CATALYZED, AND UNCATALYZED COATINGS CURED AT 135° C./30 MINUTES SCHEDULES

|  | COATING A | COATING B | COATING C |
|---|---|---|---|
| Pencil | H-2H | H-2H | H-2H |
| Methyl Ethyl Ketone |  |  |  |
| Rubs, to Mar | 200+ | 150 | 100 |
| to Remove | 200+ | 200+ | 200+ |
| Yellow Index, |  |  |  |
| Original | -2.3 | -2.4 | -2.4 |
| After 1st 30 min | -2.0 | -2.0 | -2.0 |
| Overbake |  |  |  |
| After 2nd 30 min. | -1.7 | -1.9 | -1.8 |
| Overbake |  |  |  |

*Solvent Resistance is measured by Methyl Ethyl Ketone (MEK) Double Rubs "to mar" or "to remove" the coating. Highly crosslinked coatings require 200+ (i.e. more than 200) MEK Rubs to mar.

EXAMPLE 3

A coating prepared using the curable composition of the invention, COATING D, was compared with a conventional aminoresin coating, COATING E.

COATING D and COATING E were formulated, applied onto base-coated panels and cured as follows:

|  | COATING D | COATING E |
|---|---|---|
| ACRYLIC COPOLYMER A OF EXAMPLE 1 (g): | 73.3 | 73.3 |
| CYMEL ® 303 Aminoresin Crosslinker: | 13.4 | 26.7 |
| 2,4,6-tris-(Butoxycarbonylamino)-1,3,5-triazine (g) | 13.4 | 0.0 |
| para-Toluenesulfonic Acid (g): | 0.4 | 0.4 |
| Substrate, White Base-Coated Panels: | ED-11CRS | ED-11CRS |
| Cure Schedule (Table 3): | 125° C./ 30 min | 125° C./ 30 min |

The cured coatings were thereafter analyzed for performance. The results are summarized in Table 3.

TABLE 3

PHYSICAL AND RESISTANCE PROPERTIES OF COATING D AND COATING E

|  | COATING D | COATING E |
|---|---|---|
| Thickness (mils) | 1.8 | 1.8 |
| (mm) | 0.046 | 0.046 |
| Hardness, KHN$_{25}$ | 13.1 | 13.3 |
| Pencil | H-2H | H-2H |
| Methyl Ethyl Ketone |  |  |
| Rubs, to Mar | 200+ | 200+ |
| Adhesion, Top Coat to Base Coat | 5 | 5 |
| Yellow Index, |  |  |
| Original | -4.5 | -4.7 |
| After 1st 30 min Overbake | -4.4 | -4.7 |
| After 2nd 30 min Overbake | -4.3 | -4.6 |
| Xenon Weathering, 1585 Hours, |  |  |
| Yellow Index | 2.5 | 3.0 |
| Gloss 20°/60° | 69/83 | 67/84 |

EXAMPLE 4

The experiment in EXAMPLE 3 was repeated with the exception that instead of CYMEL® 303 resin, high imino group containing CYMEL® 323 resin was used and instead of the para-toluenesulfonic acid catalyst, somewhat weaker dimethyl acid pyrophosphate cure catalyst was used. Thus, COATING F contained both an aminoresin crosslinker and a tris-carbamate co-crosslinker, whereas COATING G contained only the aminoresin crosslinker for comparison.

The cured coatings were thereafter analyzed for performance. The results are summarized in Table 4.

TABLE 4

PHYSICAL AND RESISTANCE PROPERTIES OF COATING F AND COATING G

|  | COATING F | COATING G |
|---|---|---|
| Thickness (mils) | 1.7 | 1.6 |
| (mm) | 0.043 | 0.041 |
| Hardness, KHN$_{25}$ | 12.5 | 13.9 |
| Pencil | H-2H | H-2H |
| Methyl Ethyl Ketone |  |  |
| Rubs, to Mar | 200+ | 200+ |
| to Remove | 200+ | 200+ |
| Adhesion, Top Coat to Base Coat | 5 | 3 |
| Yellow Index, |  |  |
| Original | -4.2 | -4.4 |
| After 1st 30 min Overbake | -4.2 | -4.4 |
| After 2nd 30 min Overbake | -4.1 | -4.2 |
| Xenon Weathering, 1585 Hours, |  |  |
| Yellow Index | -2.8 | -3.6 |
| Gloss 20°/60° | 75/87 | 66/83 |

EXAMPLE 5

The environmental etch resistance of COATINGS D, E, F, and G was determined as follows:

2 drops of an acid was added to the surface of a coating at room temperature and thereafter heated to 50° C. for 20 minutes. Then, the appearance of the coating was examined visually and the changes noted.

COATINGS D, E, F, and G were tested for environmental etch resistance as described above using:

(a) aqueous sulfuric acid (0.1 Normal); or (b) aqueous phosphoric acid (0.1 Normal).

The results using sulfuric acid are summarized in Table 5 and those using phosphoric acid are summarized in Table 6.

TABLE 5

ENVIRONMENTAL ETCH RESISTANCE OF COATINGS D, E, F, AND G USING 0.1 NORMAL SULFURIC ACID

| COATING | TEST RESULTS |
|---|---|
| D | Contact area swelled |
| E | Contact area etched down to base coat |
| F | Contact area swelled |
| G | Contact area swelled and severely cracked |

TABLE 6

ENVIRONMENTAL ETCH RESISTANCE OF COATINGS
D, E, F, AND G USING 0.1 NORMAL PHOSPHORIC ACID

| COATING | TEST RESULTS |
|---|---|
| D | Contact area swelled |
| E | Contact area was partially etched away |
| F | Contact area swelled |
| G | Contact area swelled and severely cracked |

EXAMPLE 6

A coating using the curable composition of the invention, COATING H, was compared with a conventional aminoresin, COATING I.

COATING H and COATING I were formulated, applied onto base-coated panels, and cured. The formulations comprise the following:

|  | COATING H | COATING I |
|---|---|---|
| TA 39-14 Acrylic resin* (g) | 72 | 65 |
| CYMEL ® 1170 Crosslinker (g) | 14 | 35 |
| 2,4,6-tris-(Butoxycarbonylamino)-1,3,5-trizaine (g) | 14 | 0 |
| para-Toluenesulfonic Acid (g) | 0.6 | 0.6 |
| Substrate, White Base-Coated Panels | ED-11 CRS | ED-11CRS |
| Cure Schedule | 125°/30 min | 125°/30 min |

*TA 39-14 Acrylic Resin is a product of Dock Resins Corp., Linden, N.J. having an equivalent weight of 450.

The cured coating were thereafter analyzed for performance. The results are summarized in TABLE 7.

TABLE 7

|  | COATING H | COATING I |
|---|---|---|
| Thickness (mils) | 1.88 | 1.65 |
| (mm) | 0.048 | 0.042 |
| Hardness, KHN$_{25}$ | 5.7 | 4.2 |
| Pencil | H–2H | F–H |
| Methyl Ethyl Ketone Rubs, to Mar | 200+ | 200+ |
| Adhesion, Top Coat to Base Coat | 5 | 5 |
| Yellow Index |  |  |
| Original | –1.8 | –1.9 |
| After 1st 30 min Overbake | –1.1 | –1.1 |
| After 2nd 30 min Overbake | –0.9 | –1.0 |
| Gloss 20°/60°, Original | 86/93 | 85/93 |

EXAMPLE 7

The procedure of EXAMPLE 5 was repeated using COATING H and COATING I. The results are summarized TABLE 8 (sulfuric acid) and TABLE 9 (phosphoric acid).

TABLE 8

ENVIRONMENTAL ETCH RESISTANCE OF
COATING H AND COATING I
USING 0.1 NORMAL SULFURIC ACID

| COATING | TEST RESULTS |
|---|---|
| H | Contact area swelled in rings |
| I | Contact area severely swollen and and slightly cracked |

TABLE 9

ENVIRONMENTAL ETCH RESISTANCE OF
COATING H AND COATING I
USING 0.1 NORMAL PHOSPHORIC ACID

| COATING | TEST RESULTS |
|---|---|
| H | Contact area was slightly swollen |
| I | Contact area was swollen |

EXAMPLE 8

The procedure of EXAMPLE 3 was repeated using a different acrylic resin, different ratios of CYMEL® 303 crosslinker and 2,4,6-tris-(butoxycarbonylamino)-1,3,5-triazine co-crosslinker to prepare COATINGS J, K, L, M, and N. The coatings were formulated, applied onto base-coated panels, and cured. The formulations comprise the following:

|  | COATINGS | | | | |
|---|---|---|---|---|---|
|  | J | K | L | M | N |
| TA 39-14 Acrylic Resin (g) | 78.0 | 77.5 | 72.2 | 76.5 | 78.2 |
| CYMEL ® 303 Crosslinker | 19.8 | 14.6 | 11.4 | 4.7 | 21.8 |
| 2,4,6-tris-(Butoxycarbonylamino)-1,3,5-triazine | 2.2 | 7.9 | 11.4 | 18.8 | 0.0 |
| para-Toluenesulfonic acid | 0.4 | 0.4 | 0.4 | 0.4 | 0.4 |
| Substrate, White Base-Coated Panels | ED-11CRS | | | | |
| Cure Schedule: | 125°/30 min | | | | |

TABLE 10

PHYSICAL AND RESISTANCE PROPERTIES OF
COATINGS J, K, L, M, AND N

|  | COATINGS | | | | |
|---|---|---|---|---|---|
|  | J | K | L | M | N |
| Thickness (mils) | 1.77 | 1.65 | 1.75 | 1.73 | 1.75 |
| (mm) | 0.045 | 0.042 | 0.044 | 0.044 | 0.044 |
| Hardness, KHN$_{25}$ | 5.9 | 5.8 | 5.8 | 6.1 | 5.9 |
| Pencil | F–H | F–H | F–H | F–H | B–HB |
| Methyl Ethyl Ketone Rubs, to Mar | 200+ | 200+ | 200+ | 200+ | 200+ |
| Adhesion, Top Coat to Base Coat | 5 | 5 | 5 | 5 | 2–3 |
| Gloss 20°/60°, Original | 86/93 | 86/93 | 87/94 | 86/93 | 86/93 |
| Yellow Index, Original | –2.4 | –2.7 | –2.1 | –2.3 | –2.5 |
| After 1st Overbake | –1.8 | –2.2 | –1.6 | –1.7 | –1.9 |
| After 2nd Overbake | –1.7 | –2.1 | –1.4 | –1.6 | –1.7 |
| Chip Resistance* | 5 | 5–6 | 5 | 4–5 | 5–6 |

*Chip Resistance scale: 0 is the best, 10 is the worst.

EXAMPLE 9

The procedure of EXAMPLE 8 used to prepare COATING L and COATING N was repeated to prepare COATING O and COATING P, respectively, with the exception that the base coat and the primer were omitted, and the bake temperature was 135° C./30 min.

The formaldehyde released during cure is measured as follows:

Coated coupons, enclosed in a glass chamber having humid air blown therethrough at a Sate of 50 ml per minute, were heated at 135° C. for 30 minutes to cure the coatings. The released formaldehyde was collected and analyzed by a procedure described in an article by J. McClure in Analytical Letters Volume 21, Number 2, page 253 (1988), the contents of which are incorporated herein by reference. The results are summarized in Table 11.

TABLE 11

FORMALDEHYDE EMISSIONS OF COATING L AND COATING N DURING CURE

|  | COATING L | COATING N |
|---|---|---|
| THICKNESS, (mils) | 1.2 | 1.2 |
| (mm) | 0.030 | 0.030 |
| HARDNESS, KHN$_{25}$ | 7.2 | 8.6 |
| FORMALDEHYDE (%)* | 1.0 | 2.0 |

*Emitted formaldehyde, based on dry film weight.

EXAMPLE 10

The procedure of EXAMPLE 3 was repeated using a formulation comprising a polyester resin instead of an acrylic resin. Further, a portion of the polyester was ground, in a three roll mill with titanium dioxide pigment and thereafter the remaining ingredients were added. COATING Q, COATING R, and COATING S were prepared as before by curing at 125° C. for 30 minutes.

The ingredients comprising the formulations and the physical and resistance properties of the cured coatings are summarized in TABLE 12.

TABLE 12

COATING PERFORMANCE OF COATINGS Q, R, AND S IN A PIGMENTED POLYESTER SYSTEM

|  | COATING Q | COATING R | COATING S |
|---|---|---|---|
| Grind base: | | | |
| Chempol 11-1369 (g) | 30.8 | 30.8 | 30.8 |
| TiPure R-960 (g) | 80.0 | 80.0 | 80.0 |
| K-Flex 2302 Polyester Resin (g) | 44.4 | 0.0 | 0.0 |
| K-Flex 2306 Polyester Resin (g) | 0.0 | 45.7 | 0.0 |
| Chempol 11-1369 Polyester Resin (g) | 0.0 | 0.0 | 38.5 |
| 2,4,6-tris-(Butoxy-carbonylamino)-1,3,5-triazine (g) | 24.8 | 23.5 | 30.7 |
| para-Toluenesulfonic Acid (g) | 0.4 | 0.4 | 0.4 |
| Substrate: Iron Phosphate-treated Cold Roll Steel (CRS) | | | |
| Coating performance | | | |
| Film thickness, (mils) | 1.2 | 1.2 | 1.2 |
| (mm) | 0.030 | 0.030 | 0.030 |
| Film hardness, KHN$_{25}$ | 2.2 | 4.6 | 15.8 |
| Pencil | H-2H | H-2H | H-2H |
| Gloss, 20/60° | 73/89 | 86/94 | 82/94 |
| Yellowness index | −3.3 | −3.3 | −3.8 |
| MEK rubs, to mar | 120 | 100 | 20 |
| to remove | 200+ | 200+ | 200+ |
| Direct impact, in-lb | 160+ | 160+ | 120 |
| Reverse impact, in-lb | 160+ | 160+ | 20 |

Although the present invention has been described with reference to certain preferred embodiments, it is apparent that modifications and changes thereof may be made by those skilled in the art, without departing from the scope of this invention as defined by the appended claims.

We claim:

1. A curable composition, comprising:
(a) a polyfunctional hydroxy group containing material;
(b) a 1,3,5-triazine-2,4,6-tris-carbamate crosslinker of the formula $C_3N_3(NHCOOR)_3$ or an oligomer thereof; and
(c) an acid cure catalyst.

2. The curable composition of claim 1, wherein R in each NHCOOR group of the 1,3,5-triazine-2,4,6-tris-carbamate is independently selected from the group consisting of an alkyl of 1 to 20 carbon atoms, an aryl of 6 to 20 carbon atoms and an aralkyl of 7 to 20 carbon atoms.

3. The curable composition of claim 2, wherein R in each NHCOOR group of the 1,3,5-triazine-2,4,6-tris-carbamate is independently selected from an alkyl of 1 to 8 carbon atoms.

4. The curable composition of claim 3, wherein the 1,3,5-triazine-2,4,6-tris-carbamate crosslinker is selected from the group consisting of 2,4,6-tris-(methoxycarbonylamino)-1,3,5-triazine, 2,4,6-tris-(butoxycarbonylamino)-1,3,5-triazine and a mixture thereof.

5. The curable composition of claim 3, wherein the 1,3,5-triazine-2,4,6-tris-carbamate crosslinker is 2,4,6-tris-(butoxycarbonylamino)-1,3,5-triazine.

6. The curable composition of claim 1, wherein the polyfunctional hydroxy group containing material is selected from the group consisting of polyols, alkyds, hydroxyfunctional acrylic resins, hydroxyfunctional polyester resins, hydroxyfunctional polyurethane prepolymers, products derived from condensation of epoxy resins with an amine, and a mixture thereof.

7. The curable composition of claim 6, wherein the polyfunctional hydroxy group containing material is a hydroxyfunctional acrylic or polyester resin.

8. The curable composition of claim 1, wherein the acid cure catalyst is selected from the group consisting of a sulfonic acid, an alkyl or aryl acid phosphate or pyrophosphate, a carboxylic acid, a sulfonimide, a mineral acid, and a mixture thereof.

9. The curable composition of claim 8, wherein acid cure catalyst is a sulfonic acid.

10. The curable composition of claim 1, wherein the weight ratio of the polyfunctional hydroxy group containing material (a) to the 1,3,5-triazine-2,4,6-tris-carbamate crosslinker (b) is in the range of from 99:1 to 0.5:1.

11. The curable composition of claim 1, wherein the weight percent of the acid cure catalyst (c) to the sum of the polyfunctional hydroxy group containing material (a) and the 1,3,5-triazine-2,4,6-tris-carbamate crosslinker (b) is in the range of from 0.01 weight percent to 3 weight percent.

12. The curable composition of claim 1, in the form of a liquid coating composition.

13. The curable composition of claim 1, in the form of a powder coating composition.

14. The curable composition of claim 1, comprising:
(a) a hydroxyfunctional acrylic or polyester resin;
(b) a carbamate crosslinker of the formula $C_3N_3(NHCOOR)_3$, wherein R in each NHCOOR group is independently selected from an alkyl of 1 to 8 carbon atoms; and
(c) an acid cure catalyst selected from the group consisting of a sulfonic acid, an alkyl or aryl acid phosphate or pyrophosphate, a carboxylic acid, a sulfonimide, a mineral acid, and a mixture thereof.

15. The curable composition of claim 1, comprising:
(a) a hydroxyfunctional acrylic resin;
(b) a carbamate crosslinking agent of the formula $C_3N_3(NHCOOR)_3$, wherein R in each NHCOOR group is independently selected from an alkyl of 1 to 8 carbon atoms; and
(c) an acid cure catalyst selected from the group consisting of a sulfonic acid and an alkyl acid pyrophosphate.

16. The curable composition of claim 14, wherein the mole ratio of the hydroxy groups of (a) to the crosslinkingly effective functionalities present in (b) is in the range of from 0.8:1 to 1.2:1, and wherein (c) is present in an amount of from about 0.01 weight percent to 3.0 weight percent based on the sum of (a) and (b).

* * * * *

UNITED STATES PATENT AND TRADEMARK OFFICE
CERTIFICATE OF CORRECTION

PATENT NO. : 5,726,254

DATED : March 10, 1998

INVENTOR(S) : Kuang-Jong Wu and Doris C. O'Toole

It is certified that error appears in the above-identified patent and that said Letters Patent is hereby corrected as shown below:

Column 16, claim 15, line 55, change "crosslinking agent" to --crosslinker--.

Signed and Sealed this

Twenty-first Day of July, 1998

*Attest:*

BRUCE LEHMAN

*Attesting Officer*  Commissioner of Patents and Trademarks